US009366292B2

(12) United States Patent
Fukama et al.

(10) Patent No.: US 9,366,292 B2
(45) Date of Patent: Jun. 14, 2016

(54) RETAINER FOR BALL BEARING, AND BALL BEARING

(71) Applicant: NTN CORPORATION, Osaka (JP)

(72) Inventors: Shohei Fukama, Shizuoka (JP);
Yasuyuki Katayama, Shizuoka (JP);
Takahiro Okada, Shizuoka (JP);
Katsuaki Sasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/701,718

(22) Filed: May 1, 2015

(65) Prior Publication Data

US 2015/0233425 A1 Aug. 20, 2015

Related U.S. Application Data

(62) Division of application No. 14/114,588, filed as application No. PCT/JP2012/060967 on Apr. 24, 2012, now Pat. No. 9,103,374.

(30) Foreign Application Priority Data

May 13, 2011 (JP) ................................. 2011-108453
Jun. 8, 2011 (JP) ................................. 2011-128331

(51) Int. Cl.
*F16C 33/38* (2006.01)

(52) U.S. Cl.
CPC ......... *F16C 33/3862* (2013.01); *F16C 33/3875* (2013.01); *F16C 33/3887* (2013.01); *F16C 2226/74* (2013.01)

(58) Field of Classification Search
CPC ............. F16C 2226/74; F16C 33/3875; F16C 33/3862; F16C 33/3887; F16C 33/66
USPC ......... 384/490, 523, 527, 529–531, 536, 539, 384/609, 614; 29/898.065, 898.067
See application file for complete search history.

(56) References Cited

U.S. PATENT DOCUMENTS

| 1,051,911 A | 2/1913 | Pondelick |
| 1,366,312 A | 1/1921 | Danielsson |

(Continued)

FOREIGN PATENT DOCUMENTS

| DE | 3341970 | 6/1984 |
| DE | 4041068 | 1/1992 |

(Continued)

OTHER PUBLICATIONS

International Search Report issued Jul. 10, 2012 in International (PCT) Application No. PCT/JP2012/060967.

(Continued)

*Primary Examiner* — Marcus Charles
(74) *Attorney, Agent, or Firm* — Wenderoth, Lind & Ponack, L.L.P.

(57) ABSTRACT

A retainer for a ball bearing includes two annular members that face each other in an axial direction thereof. The two annular members include opposed surfaces each having hemispherical pockets that are formed at positions in a circumferential direction of each of the two annular members and configured to receive balls. The opposed surfaces are snap-fitted to each other to couple together the two annular members. The hemispherical pockets each have an inner peripheral surface provided with ball contact and ball non-contact surfaces. The ball contact surface is formed at a central portion in a pocket circumferential direction and at least at a central portion in a pocket axial direction of the inner peripheral surface. The ball non-contact surface includes a recess recessed to an opposite side to a corresponding ball across the ball contact surface and is opened in at least one of pocket axial ends.

3 Claims, 9 Drawing Sheets

(56) References Cited

U.S. PATENT DOCUMENTS

| | | |
|---|---|---|
| 3,471,208 A | 10/1969 | Vannest |
| 3,539,231 A | 11/1970 | Langstrom |
| 3,586,405 A | 6/1971 | Claesson |
| 3,712,692 A | 1/1973 | Restelli |
| 3,743,369 A | 7/1973 | Langstrom |
| 4,133,588 A | 1/1979 | Earsley |
| 4,558,961 A | 12/1985 | Fernlund |
| 4,626,113 A | 12/1986 | Forknall et al. |
| 4,902,145 A | 2/1990 | Johnson |
| 7,507,028 B2 | 3/2009 | Markle |
| 2003/0012470 A1 | 1/2003 | Sugimori et al. |
| 2004/0141672 A1* | 7/2004 | Naito ............... F16C 33/416 384/531 |
| 2007/0230849 A1 | 10/2007 | Naito |
| 2008/0187263 A1* | 8/2008 | Spielfeld ............ F16C 25/08 384/523 |
| 2010/0098366 A1 | 4/2010 | Sato et al. |
| 2011/0229068 A1* | 9/2011 | Bohr ............... F16C 33/4652 384/572 |

FOREIGN PATENT DOCUMENTS

| | | | | |
|---|---|---|---|---|
| DE | 102009013978 A1 * | 9/2010 | ............. | F16C 33/46 |
| DE | 102009042076 A1 * | 3/2011 | ............. | F16C 19/26 |
| GB | 191401179 | 0/1914 | | |
| GB | 2049070 | 12/1980 | | |
| JP | 59-113320 | 6/1984 | | |
| JP | 01-261516 | 10/1989 | | |
| JP | 6-87722 | 12/1994 | | |
| JP | 2003172361 A * | 6/2003 | ............. | F16C 19/04 |
| JP | 2006-226430 | 8/2006 | | |
| JP | 2006-226447 | 8/2006 | | |
| JP | 2006-226448 | 8/2006 | | |
| JP | 2006-258172 | 9/2006 | | |
| JP | 2007-032821 | 2/2007 | | |
| JP | 2007-040383 | 2/2007 | | |
| JP | 4017827 B2 * | 12/2007 | ............. | F16C 33/41 |
| JP | 2008008411 A * | 1/2008 | | |
| JP | 2008-064221 | 3/2008 | | |
| JP | 2008-115903 | 5/2008 | | |
| JP | 2008-121817 | 5/2008 | | |
| JP | 2008232420 A * | 10/2008 | | |
| JP | 2008-281196 | 11/2008 | | |
| JP | 2009-281399 | 12/2009 | | |
| JP | WO 2010137434 A1 * | 12/2010 | ............. | F16C 33/414 |
| JP | 2012-057703 | 3/2012 | | |

OTHER PUBLICATIONS

International Preliminary Report on Patentability and Written Opinion of the International Searching Authority issued Nov. 28, 2013 in International (PCT) Application No. PCT/JP2012/060967.

Extended European Search Report dated Apr. 13, 2015 in corresponding European Patent Application No. 12785462.8.

* cited by examiner

RETAINER FOR BALL BEARING, AND BALL BEARING

CROSS-REFERENCE TO RELATED APPLICATION

This application is a divisional of U.S. patent application Ser. No. 14/114,588, filed Oct. 29, 2013.

BACKGROUND OF INVENTION

1. Technical Field

The present invention relates to a synthetic resin retainer for a ball bearing, which is configured to retain balls in a freely rollable manner, and to a ball bearing having the retainer interposed between an outer race and an inner race.

2. Background Art

Various sealed ball bearings, such as a deep groove ball bearing and an angular contact ball bearing, are widely used, for example, for a gear support shaft of a transmission of a vehicle including an engine.

A ball bearing of this type includes an inner race having a radially outer surface formed as an inner raceway surface, an outer race arranged on an outer side with respect to the inner race and having a radially inner surface formed as an outer raceway surface, and a plurality of balls interposed in a freely rollable manner between the inner raceway surface of the inner race and the outer raceway surface of the outer race. A retainer is arranged between the inner race and the outer race so as to equiangularly retain the balls. Further, seal portions are arranged in an annular space formed between the inner race and the outer race. Any one of the outer race and the inner race is mounted to a fixed part such as a housing, and another is mounted to a rotary part such as a rotary shaft.

In particular, in electric vehicles and hybrid vehicles, high-speed motor rotation is input, and hence the rotary part such as the rotary shaft tends to perform high rotation. As a result, there arise problems such as deformations of a retainer due to a lack of lubrication, torque (heat generation), and to a centrifugal force. The deformations of the retainer due to the lack of lubrication and the torque (heat generation) can be solved by appropriately designing a shape of the retainer. Further, the deformation of the retainer due to the centrifugal force can be suppressed by using a lightweight synthetic resin retainer. Meanwhile, ball bearings for automotive auxiliary electrical components (such as a motor and an alternator) are used under a state of being sealed from both sides, and hence a lubricant such as grease needs to be used.

There have been proposed various lightweight synthetic resin retainers for the purpose of suppressing the deformation of the retainers due to the centrifugal force (for example, refer to Patent Literature 1). The retainer disclosed in Patent Literature 1 is what is called a resin crown-shaped retainer including an annular main part, and pairs of elastic pieces equiangularly and integrally projected at intervals on one side in an axial direction of the main part. Then, pockets each opened to a radially outer side and a radially inner side are formed respectively between the pairs of elastic pieces, and balls are retained in the pockets in a freely rollable manner.

Further, as a countermeasure against the torque (heat generation) and in order to use the retainer irrespective of the axial orientation of the bearing, it is preferred that the retainer be formed into a symmetrical shape in the axial direction. Thus, it is essential to provide a structure for coupling separate retainers to each other. Under the circumstance, there have conventionally been proposed various retainer structures for coupling two annular members to each other (Patent Literatures 2 to 6).

CITATION LIST

Patent Literature 1: JP 2007-32821 A
Patent Literature 2: JP 2006-226430 A
Patent Literature 3: JP 2006-226447 A
Patent Literature 4: JP 2006-226448 A
Patent Literature 5: JP 2008-64221 A
Patent Literature 6: JP 2009-281399 A

Technical Problems

By the way, in the crown-shaped retainer disclosed in Patent Literature 1, as described above, the balls are retained only from one side. Thus, when a significant centrifugal force is applied, such a retainer may be non-uniformly deformed. As a result, the balls may drop off from the pockets, and may interfere with other components such as the inner race and the outer race.

By the way, the retainer disclosed in Patent Literature 1 has a structure including recessed groove-like thinned portions provided along a circumferential direction in aback surface opposite to an opposed surface provided with the pockets. The thinned portions are provided, for example, to substantially equalize thicknesses of parts of the retainer so as to suppress a deformation due to non-uniformity in thickness, and to achieve light-weighting of the retainer.

However, in the structure including the thinned portions provided in the back surface of the retainer, during rotation of the retainer, a lubricant filled inside the bearing enters the thinned portions in the back surface of the retainer. As a result, stirring resistance of the lubricant may be increased, and an imbalance force may be applied to the retainer. Thus, smooth rotation may be affected. In particular, at the time of high-speed rotation, the stirring resistance of the lubricant increases, and hence torque (heat) to be generated between the retainer and the balls is difficult reduce. This is a serious problem because, in recent years, torque reduction of automotive ball bearings is demanded also in view of environmental issues for higher fuel efficiency and the like.

As described in Patent Literatures 2 to 6, in the retainers formed into a symmetrical shape in the axial direction, the pockets for retaining steel balls (balls) each have an inner peripheral surface formed of a uniform curve surface in conformity with the balls. Thus, resistance against shearing by the balls with respect to an oil (lubricant such as grease) is generated. This shearing resistance is generated at the time of shearing oil films formed between an internal side of the pocket and the steel ball (ball) held in the pocket. Further, resistance is generated at the time of passage of the lubricant through a minute gap between the ball and the internal side of the pocket of the retainer for covering the ball. In this way, in the conventional retainers, reduction in torque is difficult to achieve.

SUMMARY OF INVENTION

Under the circumstances, the present invention has been proposed in view of the problems described above, and it is an object thereof to provide a retainer for a ball bearing and a ball bearing, which are capable of reducing torque.

Solution to Problems

According to one embodiment of the present invention, there is provided a resin retainer for a ball bearing, comprising a pair of annular members that face each other in an axial direction thereof, the pair of annular members having opposed surfaces each comprising hemispherical pockets that are formed at a plurality of positions in a circumferential direction of each of the pair of annular members and configured to receive balls, the pair of annular members being integrated with each other in a symmetrical shape in which the pair of annular members overlap each other in the circumferential direction, in which the hemispherical pockets each have an inner peripheral surface including a ball contact surface and a ball non-contact surface, in which the ball contact surface is formed at a central portion in a pocket circumferential direction of the inner peripheral surface and at least at a central portion in a pocket axial direction of the inner peripheral surface, in which the ball non-contact surface comprises a recess that is recessed to an opposite side to corresponding one of the balls across the ball contact surface, and in which the recess is opened in at least one of pocket axial ends.

According to the retainer for a ball bearing, the ball non-contact surface is provided on the inner peripheral surface, and hence a relief portion for a lubricant can be formed on an internal side of each of the hemispherical pockets. With this, not only resistance generated at the time of passage of the lubricant through the internal side of each of the hemispherical pockets, but also an amount of oil films to be formed between the balls and the hemispherical pockets can be reduced. In addition, the recess forming the ball non-contact surface is opened in the at least one of the pocket axial ends, and hence extra lubricant between the inner peripheral surface of the retainer for a ball bearing and the balls (steel balls) can be discharged therethrough. Further, the ball contact surface is provided at the central portion of the inner peripheral surface, and hence each of the balls (steel balls) can be stably retained in the pocket central portion.

The ball contact surface may be formed at the central portion in the pocket axial direction and at the central portion in the pocket circumferential direction of the inner peripheral surface of each of the hemispherical pockets, and the ball non-contact surface may comprise a C-shaped recess comprising: parts provided on both sides in the pocket circumferential direction of the ball contact surface; and a part provided on a side of one of the pocket axial ends on a bearing radially outer side. With this setting, the lubricant between the inner peripheral surface and each of the balls can be more easily discharged by a centrifugal force.

The ball contact surface may comprise an oblong portion formed at the central portion in the pocket circumferential direction of the inner peripheral surface so as to reach both the pocket axial ends, the ball non-contact surface may comprise circular-arc recesses provided on both sides in the pocket circumferential direction of the ball contact surface, and the circular-arc recesses may be each opened in both the pocket axial ends. Also with this setting, extra lubricant between the inner peripheral surface and each of the balls can be discharged from a bearing radially outer side and a bearing radially inner side.

It is preferred that the retainer further comprise coupling portions for coupling the two annular members to each other by snap-fitting the opposed surfaces to each other, that the coupling portions be provided at both end portions in the circumferential direction of the each of the hemispherical pockets, and that the two annular members each have a back surface located on an opposite side to corresponding one of the opposed surfaces and formed into a flat shape over an entire periphery thereof.

In this way, when the back surface located on the opposite side to each of the opposed surfaces that are snap-fitted to each other for coupling the two annular members to each other with the coupling portions provided at both the end portions in the circumferential direction of each of the hemispherical pockets is formed into a flat shape over the entire periphery thereof, thinned portions need not be provided unlike conventional retainers. Thus, stirring resistance of the lubricant is not increased during rotation. As a result, torque (heat) to be generated between the retainer for a ball bearing and the balls can be easily reduced.

It is desired that this retainer for a ball bearing have a structure in which the coupling portions each comprise: a radially outer projection formed by extending, in the axial direction, a radially outer side of the end portion in the circumferential direction of the each of the hemispherical pockets of one of the two annular members so as to allow an inner peripheral surface thereof to abut against the corresponding one of the balls; a radially inner recess formed by recessing a radially inner side of the end portion in the circumferential direction; a radially inner projection formed by extending, in the axial direction, a radially inner side of the end portion in the circumferential direction of the each of the hemispherical pockets of another of the two annular members so as to allow an inner peripheral surface thereof to abut against the corresponding one of the balls; and a radially outer recess formed by recessing a radially outer side of the end portion in the circumferential direction, in which the radially outer projection and the radially inner projection are engaged with each other in the axial direction by inserting the radially outer projection into the radially outer recess and by inserting the radially inner projection into the radially inner recess, and in which an engagement surface of the radially outer projection and an engagement surface of the radially inner projection are inclined with respect to the axial direction in a manner that the radially outer projection and the radially inner projection are each thicker on a distal end side than on a proximal end side.

In this retainer for a ball bearing, when the radially outer projection and the radially inner projection are engaged with each other in the axial direction, a frictional force is generated along each of the engagement surface of the radially outer projection and the engagement surface of the radially inner projection. Further, the engagement surface of the radially outer projection and the engagement surface of the radially inner projection are inclined with respect to the axial direction in a manner that the radially outer projection and the radially inner projection are each thicker on the distal end side than on the proximal end side. As a result, an axial component of a reactive force generated in a normal direction of each of the engagement surface of the radially outer projection and the engagement surface of the radially inner projection is provided. The frictional force generated along each of the engagement surface of the radially outer projection and the engagement surface of the radially inner projection, and the axial component of the reactive force generated in the normal direction of each of the engagement surfaces are applied synergistically with each other. Thus, even when a significant centrifugal force is applied due to high rotation, the two annular members can be reliably prevented from being separated from each other in the axial direction.

In this retainer for a ball bearing, it is desired that, in each of the coupling portions, an inclination angle of the engagement surface of the radially outer projection and an inclination angle of the engagement surface of the radially inner projection be each set to 5° or more. When the inclination angles are set to this value, deformation of the engagement surfaces at the time of application of a significant centrifugal force due to high rotation can be easily suppressed. As a result, the axial component of the reactive force can be reliably applied to the engagement surfaces, and hence a force of coupling the two annular members to each other can be easily secured. Note that, when the inclination angle of each of the engagement surfaces is less than 5°, in the case where a significant centrifugal force is applied due to high rotation, the deformation of the engagement surfaces is difficult to suppress. As a result, the axial component of the reactive force is difficult to reliably apply to the engagement surfaces.

It is desired that this retainer for a ball bearing have a structure in which, in the each of the coupling portions, the radially inner projection is formed to be thicker than the radially outer projection. With this, at the time of the application of a significant centrifugal force due to high rotation, the radially inner projection is deformed more significantly than the radially outer projection. This is because the radially inner projection is larger than the radially outer projection not only in thickness but also in mass. Here, the engagement surface of the radially outer projection and the engagement surface of the radially inner projection are inclined with respect to the axial direction in a manner that the radially outer projection and the radially inner projection are each thicker on the distal end side than on the proximal end side. Thus, the radially inner projection is deformed to increase the force of coupling the engagement surface of the radially outer projection and the engagement surface of the radially inner projection to each other.

It is desired that this retainer for a ball bearing have a structure in which, in the each of the coupling portions, the radially outer projection and the radially inner recess are formed at one of both the end portions in the circumferential direction of the each of the hemispherical pockets, and the radially inner projection and the radially outer recess are formed at another of both the end portions in the circumferential direction of the each of the hemispherical pockets. With this structure, annular members of one type can be manufactured with the same die set and respectively used as one of the two annular members and another of the two annular members. Thus, manufacturing cost can be reduced.

The retainer may further comprise flange portions provided respectively to a radially outer portion on an opposite side to the each of the coupling portions of the two annular members, and to a radially inner portion on the opposite side to the each of the coupling portions. With such flange portions thus provided, it is possible to restrict inflow of the lubricant into an inside (inside of the bearing) and prevent outflow of the lubricant from the inside (inside of the bearing) to the outside of the bearing.

In this retainer for a ball bearing, it is desired that the each of the hemispherical pockets have a circumferential clearance set to be larger than an axial clearance thereof. With this, even under a high moment load, circumferential lead and lag of each of the balls in the hemispherical pockets can be absorbed. As a result, durability of the retainer for a ball bearing can be enhanced. In this case, it is desired that the circumferential clearance of the each of the hemispherical pockets be set to be 1.38 times or more as large as the axial clearance thereof. With this, under a high moment load, the circumferential lead and lag of each of the balls in the hemispherical pockets can be reliably absorbed. Note that, in each of the hemispherical pockets, when the circumferential clearance is less than 1.38 times as large as the axial clearance, the circumferential lead and lag of each of the balls in the hemispherical pockets is difficult to reliably absorb.

By the way, in the present invention, it is preferred that the two annular members be each made of a synthetic resin in view of light-weighting of the retainer for a ball bearing. In particular, as a material for the retainer for a ball bearing, there may be used any one of a polyamide resin, a polyether ether ketone resin (PEEK), and a polyphenylene sulfide resin (PPS). As the polyamide resin, there may be used a polyamide 66 (PA66), a polyamide 46 (PA46), a polyamide 9T (PA9T), a polyamide 11 (PA11), or a polyamide 6 (PA6). The polyamide resin such as PA66 is excellent in tensile elongation, tensile strength, shock resistance, abrasion resistance, lubricity, and the like. The polyphenylene sulfide resin (PPS) is engineering plastic excellent in heat resistance, chemical resistance, and forming precision. The polyether ether ketone resin (PEEK) is a thermoplastic resin having markedly high heat resistance, and having not only excellent fatigue resistance but also excellent abrasion resistance, dimensional stability, and chemical resistance.

A ball bearing may comprise: the retainer for a ball bearing, which is structured as describe above, an outer race; an inner race; and balls interposed between the outer race and the inner race, the outer race and the inner race being rotated relative to each other. In particular, the present invention is suited to a sealed ball bearing comprising a seal portion that is arranged in an annular space formed between the inner race and the outer race, and comprises a seal lip formed of an elastic member.

It is preferred that the ball bearing be applied to a transmission. The transmission refers to a main speed change device for converting a drive force from an engine to speed and transmitting the drive force thus converted to a drive shaft and the like, and is roughly classified into a manual type and an automatic type. Further, depending on a drive system of a vehicle, the transmission also refers to a front-wheel drive (FWD) transaxle, a rear-wheel drive (RWD) transmission, and a four-wheel drive (4WD) transfer (auxiliary speed change device). The ball bearing is interposed, for example, between a main shaft and a main drive gear.

Advantageous Effects of Invention

In the retainer for a ball bearing according to the present invention, it is possible to reduce the resistance generated at the time of passage of a lubricant through the inside of the pockets, and an amount of oil films to be sheared due to movement of the balls. As a result, reduction in torque of the bearing (ball bearing) using this retainer can be achieved. In addition, extra lubricant between the inner peripheral surface and the balls (steel balls) can be discharged therethrough. As a result, the effect of the extra lubricant on the torque can be eliminated. Further, each of the balls (steel balls) can be stably retained in the pocket central portion. Thus, it is possible to prevent backlash of the balls, and provide a high-quality product. In addition, with use of the two annular members, deformation due to a centrifugal force and drop-off of the ball can be effectively prevented.

Irrespective of whether the ball non-contact surface is provided on the pocket axial end side or on both sides in the pocket circumferential direction of the ball contact surface, extra lubricant between surfaces opposed to the balls and the balls can be discharged. In this way, the effect of the extra oil on the torque can be stably eliminated.

With the flange portions provided as described above, it is possible to restrict the inflow of the lubricant into the inside (inside of the bearing) and prevent the outflow of the lubricant from the inside (inside of the bearing) to an outside of the bearing. Thus, the lubricant can be stably maintained, and effective reduction in torque can be achieved.

When the back surface located on the opposite side to each of the opposed surfaces that are snap-fitted to each other for coupling the two annular members to each other with the coupling portions provided at both the end portions in the circumferential direction of each of the pockets is formed into a flat shape over the entire periphery thereof, thinned portions need not be provided unlike conventional retainers. Thus, stirring resistance of the lubricant is not increased during rotation. As a result, torque (heat) to be generated between the retainer and the balls can be easily reduced.

As a material for the retainer, there may be used a polyamide resin excellent in tensile elongation, tensile strength, shock resistance, abrasion resistance, lubricity, and the like. Accordingly, it is possible to provide a high-quality retainer.

According to the ball bearing of the present invention, deformation of the retainer due to high-speed rotation can be suppressed, and reduction in torque can be achieved through the restriction on an amount of the inflow of a lubricant and the reduction of the stirring resistance. Thus, when this bearing is used in an automobile, fuel efficiency becomes higher, and hence environmentally friendly driving can be performed. In other words, an automotive ball bearing suited to high rotation bearings used in electric vehicles and hybrid vehicles can be provided. In particular, this ball bearing is optimum to automotive transmissions.

DESCRIPTION OF EMBODIMENTS

Figure 1:
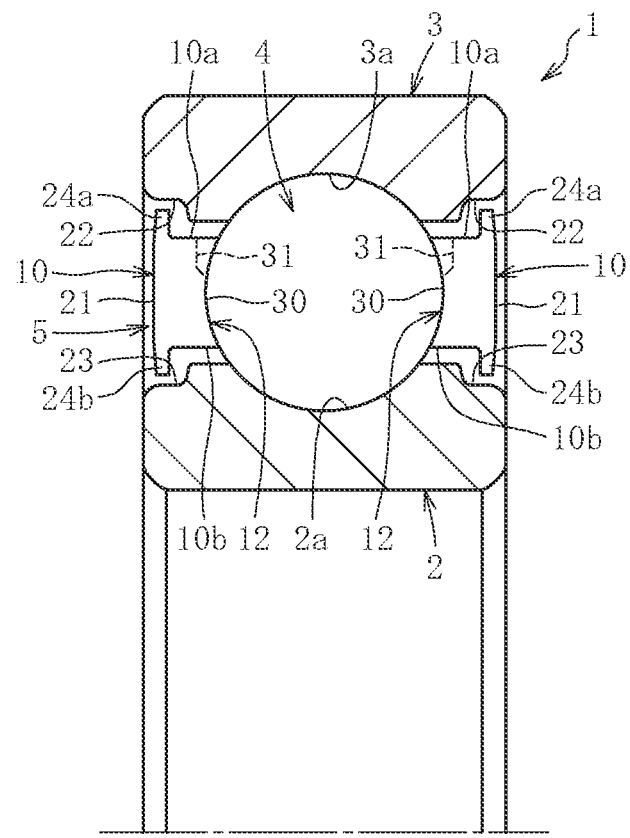
FIG. 1 is a sectional view of a ball bearing using a retainer according to an embodiment of the present invention.

In the following, description is made of embodiments of the present invention with reference to the drawings.

A ball bearing 1 according to this embodiment comprises, as a main part, an inner race 2 having a radially outer surface formed as an inner raceway surface 2a, an outer race 3 arranged on an outer side with respect to the inner race 2 and having a radially inner surface formed as an outer raceway surface 3a, a plurality of balls 4 interposed in a freely rollable manner between the inner raceway surface 2a of the inner race 2 and the outer raceway surface 3a of the outer race 3, and a retainer 5 arranged between the inner race 2 and the outer race 3 so as to equiangularly retain the balls 4. Any one of the outer race 3 and the inner race 2 is mounted to a fixed part such as a housing, and another is mounted to a rotary part such as a rotary shaft.

Figure 3:
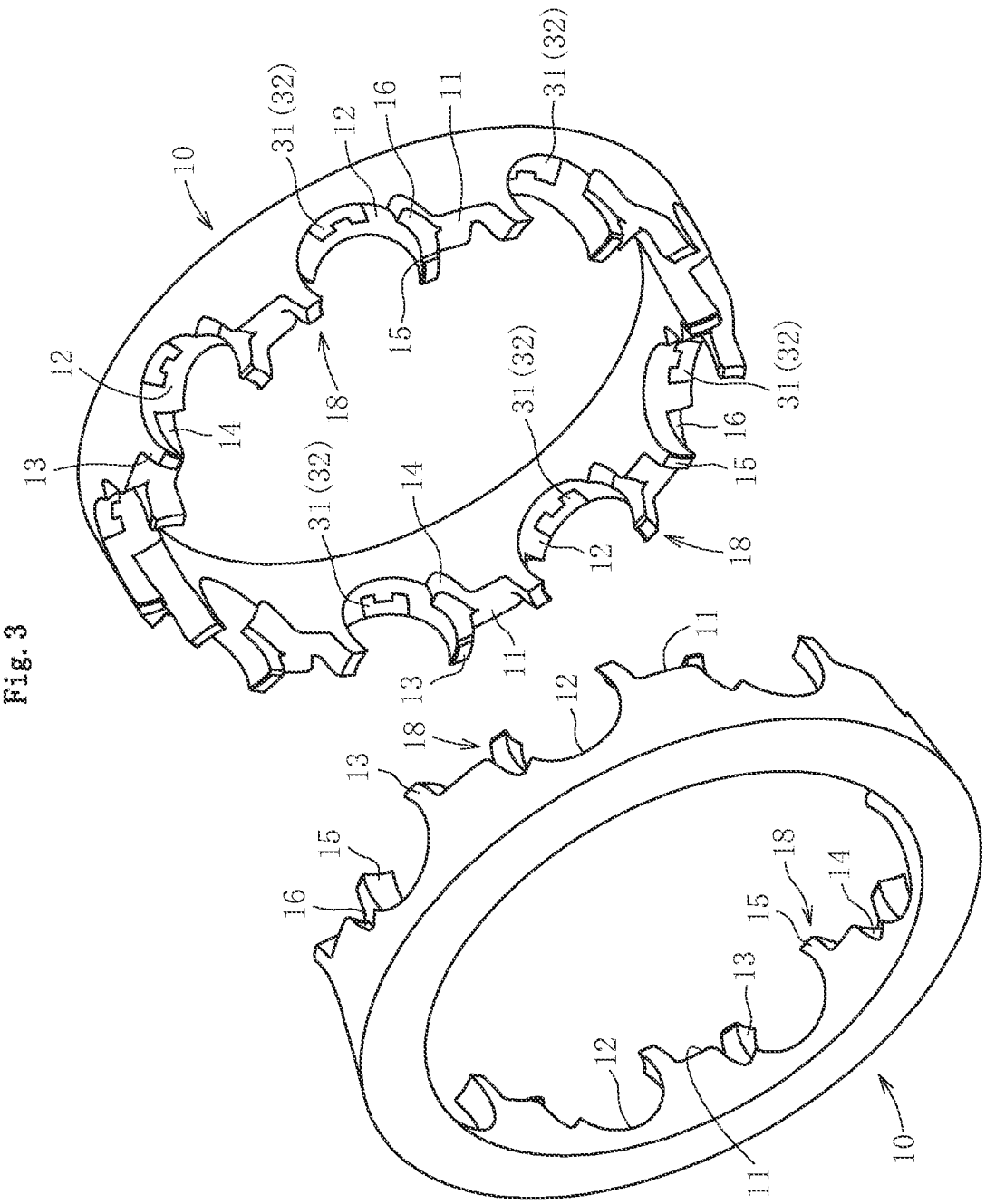
FIG. 3 is a perspective view illustrating a pre-assembly state of the retainer illustrated in FIG. 1.
Figure 4:
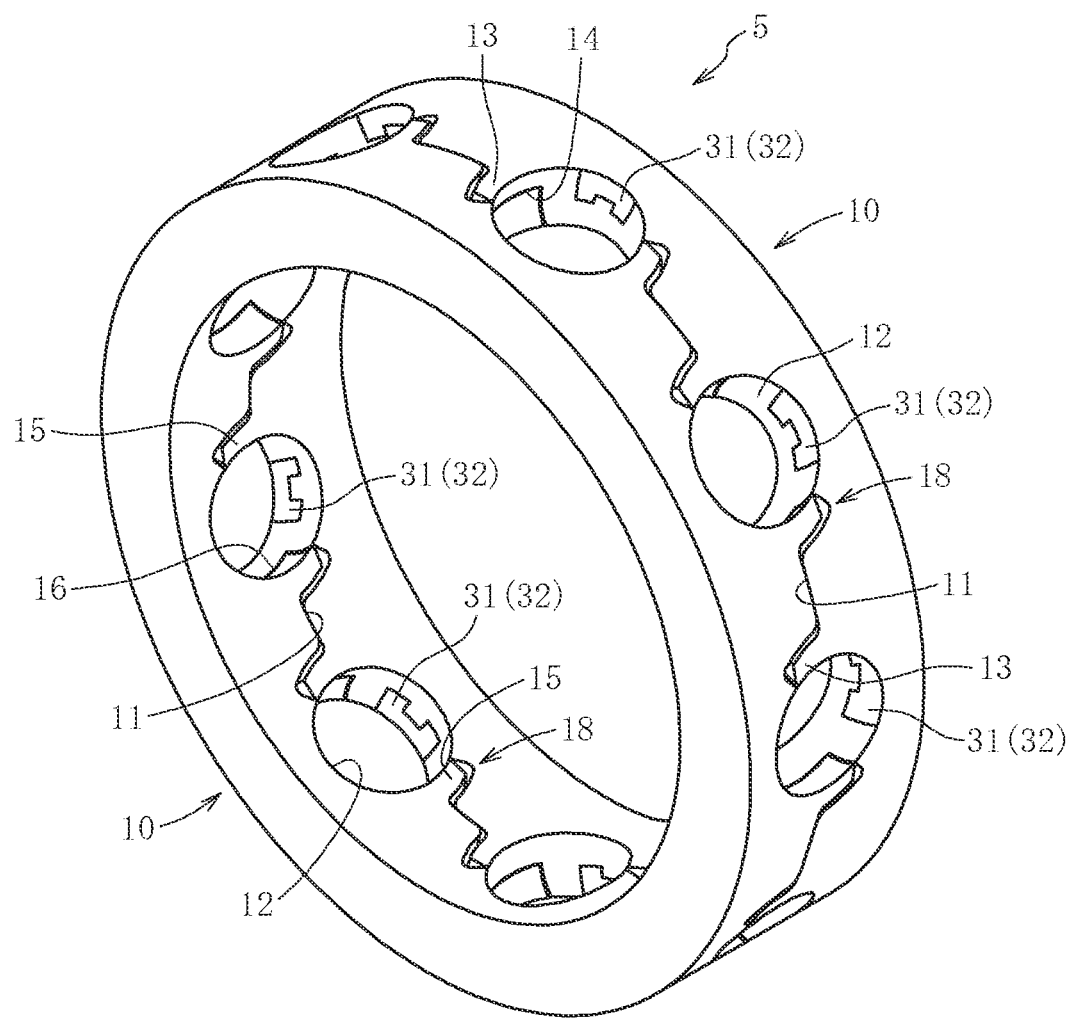
FIG. 4 is a perspective view illustrating an assembled state of the retainer illustrated in FIG. 1.

As illustrated in FIG. 3, the retainer 5 comprises two annular members 10 facing each other in an axial direction thereof and having opposed surfaces 11 each comprising hemispherical pockets 12 that are formed at a plurality of positions in a circumferential direction of the annular members 10 and configured to receive the balls 4, and has a symmetrical shape in which the two annular members 10 are coupled to each other by snap-fitting the respective opposed surfaces 11 of the annular members 10 to each other. The retainer 5 according to this embodiment comprises a coupling structure (described below) for coupling the two annular members 10 to each other.

Figure 2:
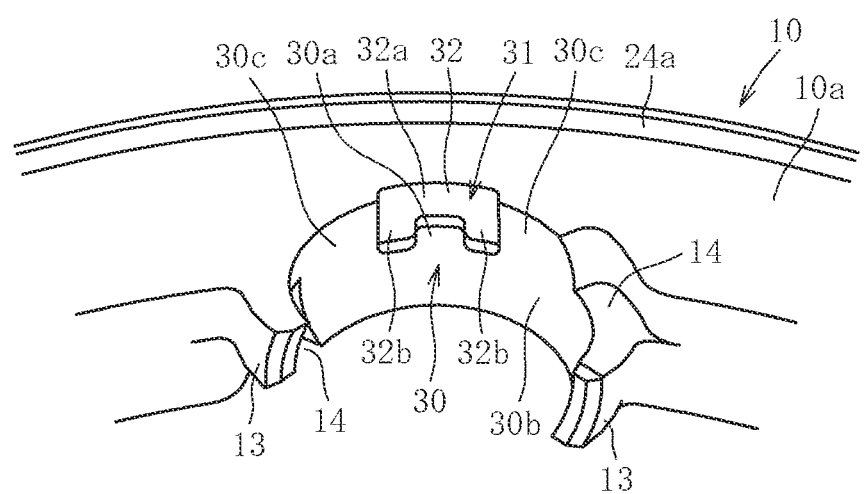
FIG. 2 is an enlarged perspective view of a main part of the retainer illustrated in FIG. 1.

As illustrated in FIG. 2, the pockets 12 of the retainer 5 each have an inner peripheral surface including a ball contact surface 30 and a ball non-contact surface 31. In other words, the inner peripheral surface of each of the pockets 12 has a recess 32, and the recess 32 forms the ball non-contact surface 31.

The recess 32 as the ball non-contact surface 31 is a C-shaped recess comprising a pocket peripheral portion 32a arranged on a side of one of pocket axial end portions (radially outer side), and a pair of end portions 32b and 32b arranged on both end sides of the pocket peripheral portion 32a and extending inward. Thus, the ball contact surface 30 comprises an intermediate part 30a arranged between the end portions 32b and 32b of the recess, a pocket peripheral portion 30b on a radially inner side, and end portions 30c and 30c on the radially outer side.

The recess 32 as the ball non-contact surface 31 is opened (released) in one of pocket axial ends (retainer radially outer surface 10a). The recesses 32 and 32 of the annular members 10 and 10 are arranged on the same side in a pocket axial direction (on bearing radially outer side) so as to face each other when the pair of the annular members 10 and 10 are assembled with each other (refer to FIG. 1).

A radially outer portion and radially inner portion on an opposite side to coupling portions of each of the annular members 10 respectively comprise flange portions 24a and 24b. In other words, the flange portion 24a on the bearing radially outer side extends to the bearing radially outer side, and the flange portion 24b on a bearing radially inner side extends to the bearing radially inner side. In this case, end surfaces 21 on the opposite side to the coupling portions are each formed into a flat shape (flat surface) parallel to a bearing axial end surface, and end surfaces of the flange portions 24a and 24b on the opposite side to the coupling portions are inclined to project toward the coupling portions side. Note that, in conformity with the flange portions 24a and 24b thus provided, peripheral cutout portions 22 are provided along axial end portions of the radially inner surface of the outer race 3, and peripheral cutout portions 23 are provided along axial end portions of the radially outer surface of the inner race 2.

As means for coupling the two annular members 10 to each other, the retainer 5 described above in this embodiment comprises the coupling structure described below. Note that, in FIGS. 3 to 6 for describing the coupling structure, the flange portions 24a and 24b are omitted for the sake of simplicity of illustration. Thus, the retainer 5 illustrated in FIGS. 3 to 6 actually includes with the flange portions 24a and 24b.

As illustrated in FIGS. 3 to 6, the two annular members 10 each comprise radially outer projections 13 each formed by extending a radially outer side of one peripheral end portion of each of the pockets 12 in the axial direction, radially inner recesses 14 each formed by recessing a radially inner side thereof, radially inner projections 15 each formed by extending a radially inner side of another peripheral end portion of each of the pockets 12 in the axial direction, and radially outer recesses 16 each formed by recessing a radially outer side thereof.

In this way, in each of the two annular members 10, the one peripheral end portion of each of the pockets 12 has the radially outer projection 13 and the radially inner recess 14, and the another peripheral end portion thereof has the radially inner projection 15 and the radially outer recess 16. Through employment of this structure, the annular members 10 of one type can be manufactured with the same die set and respectively used as one of the annular members 10 and another of the annular members 10. Thus, manufacturing cost can be reduced.

Figure 7:
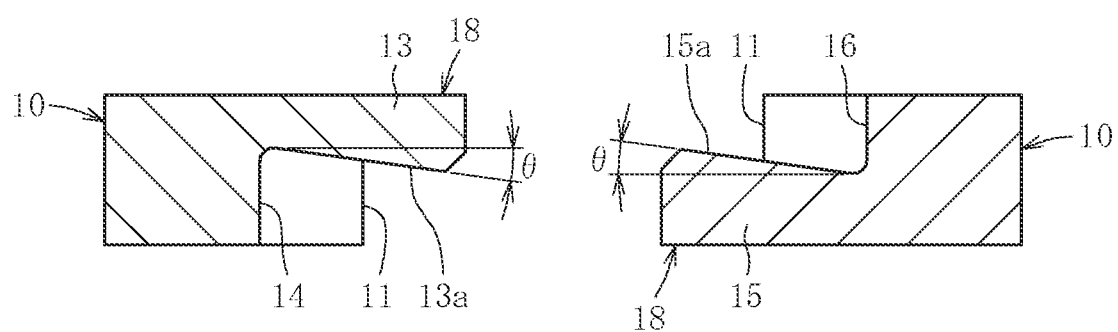
FIG. 7 is a sectional view taken along the line VII-VII in FIG. 5.
Figure 8:
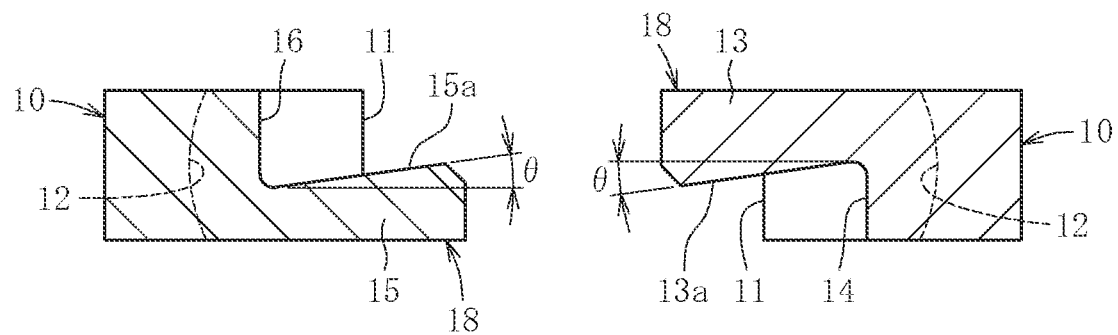
FIG. 8 is a sectional view taken along the line VIII-VIII in FIG. 5.

In this structure, the radially outer projections 13 of the one of the annular members 10 are inserted into the radially outer recesses 16 of the another of the annular members 10, and the radially inner projections 15 of the one of the annular members 10 are inserted into the radially inner recesses 14 of the another of the annular members 10. With this, the radially outer projections 13 and the radially inner projections 15 are engaged with each other in the axial direction. Further, engagement surfaces 13a and 15a of the radially outer projections 13 and the radially inner projections 15 are inclined with respect to the axial direction in a manner that the radially outer projections 13 and the radially inner projections 15 are each thicker on a distal end side than on a proximal end side (refer to FIGS. 7 and 8).

Figure 5:
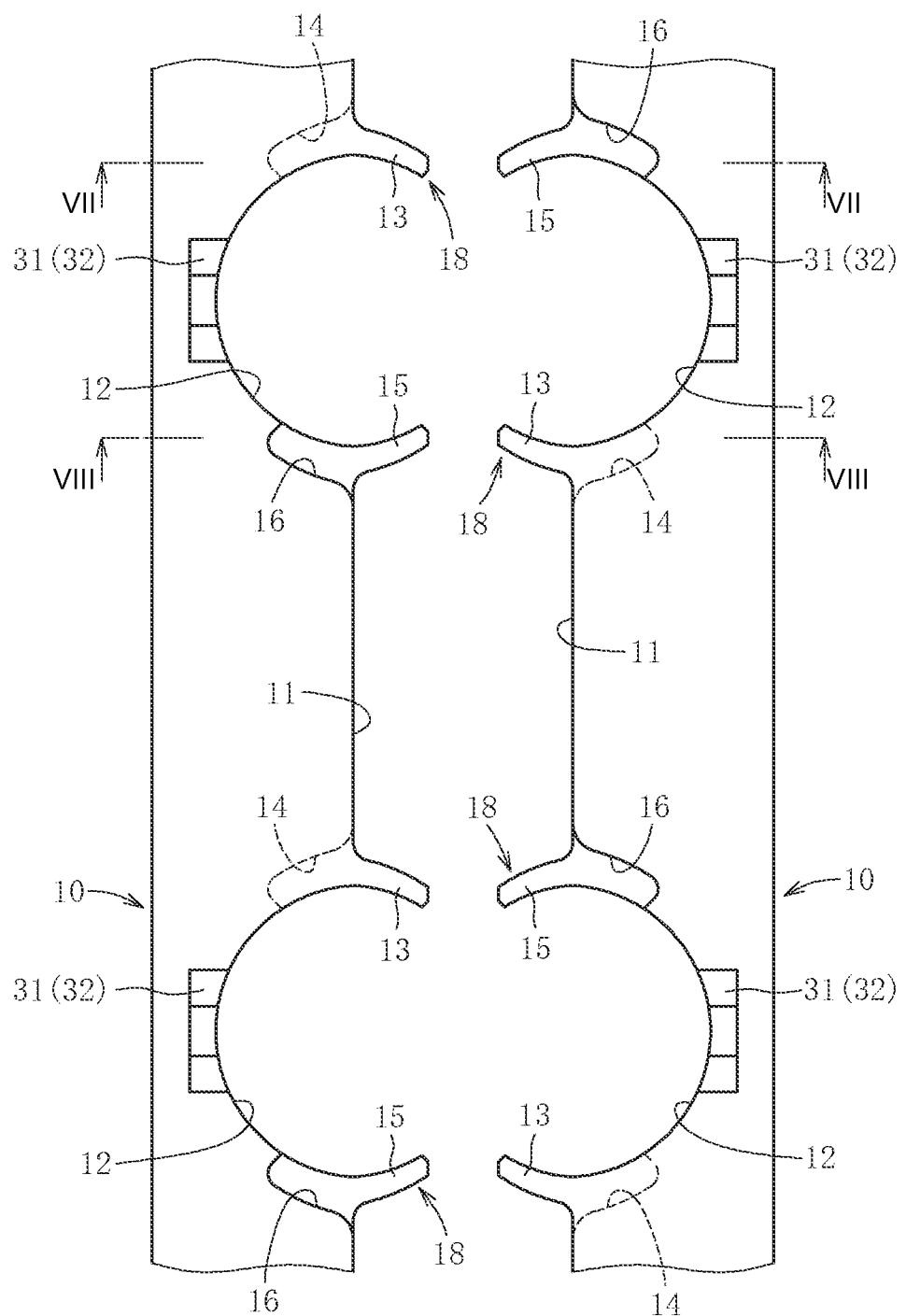
FIG. 5 is a developed view illustrating the pre-assembly state of the retainer illustrated in FIG. 1.

As illustrated in FIGS. 3 and 5, the respective opposed surfaces 11 of the two annular members 10 are snap-fitted to each other, and the radially outer projections 13 and the radially inner projections are engaged with each other with a predetermined amount of interference in the axial direction. As a result, a frictional force is generated along each of the engagement surfaces 13a and 15a of the radially outer projections 13 and the radially inner projections 15. Further, the engagement surfaces 13a and 15a of the radially outer projections 13 and the radially inner projections 15 are inclined with respect to the axial direction in a manner that the radially outer projections 13 and the radially inner projections 15 are each thicker on the distal end side than on the proximal end side. As a result, an axial component of a reactive force generated in a normal direction of each of the engagement surfaces 13a and 15a of the radially outer projections 13 and the radially inner projections 15 is provided.

The frictional force generated along each of the engagement surfaces 13a and 15a of the radially outer projections 13 and the radially inner projections 15, and the axial component of the reactive force generated in the normal direction of each of the engagement surfaces 13a and 15a are applied synergistically with each other. Thus, even when a significant centrifugal force is applied due to high rotation, the two annular members 10 can be reliably prevented from being separated from each other in the axial direction.

In this way, at both the peripheral end portions of the pockets 12 of the annular members 10, the radially outer projections 13, the radially inner recesses 14, the radially inner projections 15, and the radially outer recesses 16 are provided as coupling portions 18. With this, in the case where a significant centrifugal force is applied due to high rotation, even when the one of the annular members 10 and the another of the annular members 10 are to be separated from each other toward an outer side in the axial direction and the pockets 12 are to be opened, the balls 4 are easily kept received in the pockets 12 by the coupling portions 18 described above.

In the coupling structure of this embodiment, inclination angles θ (refer to FIGS. 7 and 8) of the engagement surfaces 13a and 15a of the radially outer projections 13 and the radially inner projections 15 each need to be set to 5° or more. When the inclination angles θ are set to this value, deformation of the engagement surfaces 13a and 15a at the time of application of a significant centrifugal force due to high rotation can be easily suppressed. As a result, the axial component of the reactive force can be reliably applied to the engagement surfaces 13a and 15a, and hence a force of coupling the two annular members 10 to each other can be easily secured. Note that, when the inclination angles θ of the engagement surfaces 13a and 15a are each less than 5°, in the case where a significant centrifugal force is applied due to high rotation, the deformation of the engagement surfaces 13a and 15a is difficult to suppress. As a result, the axial component of the reactive force is difficult to reliably apply to the engagement surfaces 13a and 15a.

Figure 9:
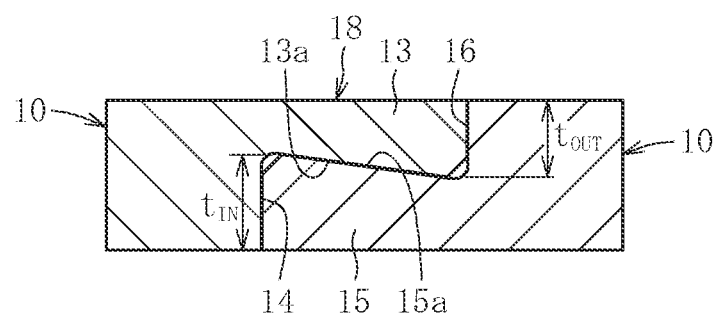
FIG. 9 is a sectional view taken along the line IX-IX in FIG. 6.
Figure 10:
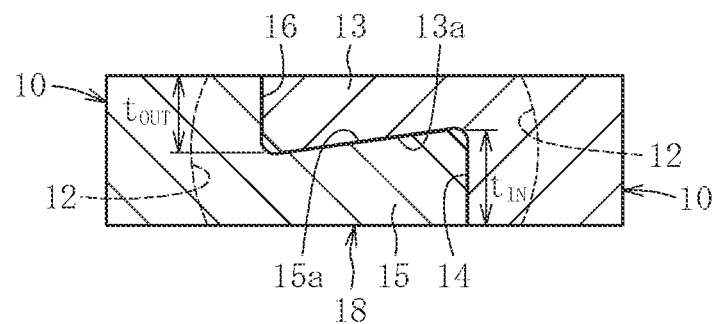
FIG. 10 is a sectional view taken along the line X-X in FIG. 6.

Further, in this coupling structure, as illustrated in FIGS. 9 and 10, the radially inner projections 15 are formed to be thicker than the radially outer projections 13 (tIN>tOUT). When the radially inner projections 15 are formed to be thicker than the radially outer projections 13 in this way, at the time of the application of a significant centrifugal force due to high rotation, the radially inner projections 15 are deformed more significantly than the radially outer projections 13. This is because the radially inner projections 15 are larger than the radially outer projections 13 not only in thickness but also in mass. Here, the engagement surfaces 13a and 15a of the radially outer projections 13 and the radially inner projections 15 are inclined with respect to the axial direction in a manner that the radially outer projections 13 and the radially inner projections 15 are each thicker on the distal end side than on the proximal end side. Thus, the radially inner projections 15 are deformed to increase a force of coupling the engagement surfaces 13a and 15a of the radially outer projections 13 and the radially inner projections 15 to each other.

Figure 6:
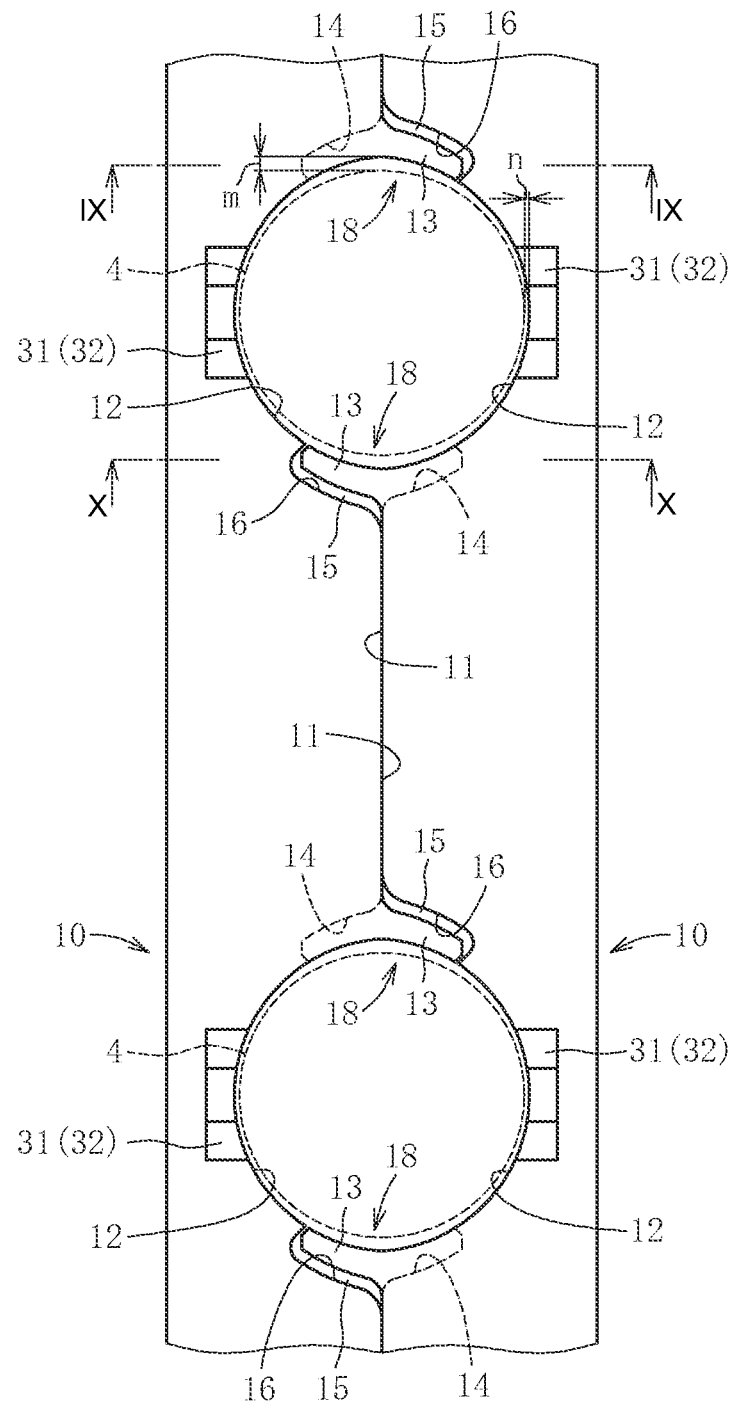
FIG. 6 is a developed view illustrating the assembled state of the retainer illustrated in FIG. 1.

By the way, the ball bearing 1 is used on the premise of oil lubrication, and hence pocket clearances need to be secured so as to reduce shearing resistance of oil films. In the retainer 5 of this embodiment, as illustrated in FIG. 6, a circumferential clearance m of each of the pockets 12 with respect to the balls 4 is set to be larger than an axial clearance n thereof. In this way, when the circumferential clearance m is set to be larger than the axial clearance n in each of the pockets 12, the following advantage can be obtained. In a case where the ball bearing 1 is used in an environment of a high moment load, even when circumferential lead and lag of the ball 4 are to occur in each of the pockets 12 in accordance with an increase or a decrease in contact angle of the ball bearing 1, the lead and lag of the ball 4 can be absorbed with the circumferential clearance m. As a result, an undesired tensile load is not applied to the retainer 5, and hence durability of the retainer 5 can be enhanced.

In this case, in each of the pockets 12, it is effective to set the circumferential clearance m to be 1.38 times or more as large as the axial clearance n. With this setting, under a high moment load, the circumferential lead and lag of the ball 4 in each of the pockets 12 can be reliably absorbed with the circumferential clearance m. Note that, in each of the pockets 12, when the circumferential clearance m is less than 1.38 times as large as the axial clearance n, the circumferential lead and lag of the ball 4 in each of the pockets 12 are difficult to reliably absorb with the circumferential clearance m. Meanwhile, when the axial clearance n is set to be large, behavior of the balls 4 becomes unstable, and hence such setting is inappropriate.

The two annular members 10 may be made of this kind of generally used resin excellent in abrasion resistance, seizure resistance, and the like, and examples thereof include synthetic resins such as a polyethylene, a polyamide, a polyacetal, a polyethylene terephthalate, a polybutylene terephthalate, a polycarbonate, a polyphenylene sulfide, a polyether sulfone, a polyether imide, a polyamide imide, a polyether ether ketone, a thermoplastic polyimide, a thermosetting polyimide, an epoxy resin, and a phenol resin. Further, it is possible to employ one including a thermoplastic resin such as a polyamide, a polyphenylene sulphide, or a polyether ether ketone as a base material and glass fiber added for strength improvement and dimensional stability.

However, in the present invention, a polyamide resin excellent in tensile elongation, tensile strength, shock resistance, abrasion resistance, lubricity, and the like is preferred as the material for the retainer 5. Examples of the polyamide resin may include a polyamide 66 (PA66), a polyamide 46 (PA46), a polyamide 9T (PA9T), a polyamide 11 (PA11), and a polyamide 6 (PA6). As described above, according to the present invention, as a material for the retainer, there may be used a polyamide resin excellent in tensile elongation, tensile strength, shock resistance, abrasion resistance, lubricity, and the like. Accordingly, it is possible to provide a high-quality retainer. When an oil to be used contains a large amount of resin attacking components (phosphorous and sulfur), in terms of oil resistance superiority expressed by PPS>PA46>PA66, PPS is preferably used. Meanwhile, a relationship of prices of the resin materials is expressed by PA66>PA46>PPS, and hence it is desired to select the material in consideration of the resin attacking property of the oil to be used. Note that, the outer race 3, the inner race 2, and the ball 4 are made of a metal such as bearing steel and carburized steel.

Grease to be filled in the ball bearing is a semisolid lubricant formed of a base oil, a thickening agent, and an additive. The base oil constituting the lubricating grease is not particularly limited as long as it is an oil generally used as base oil of lubricating grease, and examples thereof include: mineral oils such as a paraffin-based mineral oil and a naphthene-based mineral oil; hydrocarbon-based synthetic oils such as a polybutene, a poly-α-olefin, an alkylbenzene, an alkylnaphthalene, and an alicyclic compound; and a natural fat and oil, a polyol ester oil, a phosphate ester, a diester oil, a polyglycol oil, a silicone oil, a polyphenyl ether oil, an alkyldiphenyl ether oil, and a fluorinated oil as a nonhydrocarbon-based synthetic oil.

In addition, examples of the thickening agent include: metal soap-based thickening agents such as aluminum soap, lithium soap, sodium soap, complex lithium soap, complex calcium soap, and complex aluminum soap; and urea-based compounds such as a diurea compound and a polyurea compound. Those thickening agents may be used alone, or two or more kinds thereof may be used in combination.

As a known additive for the lubricating grease, there are given, for example: an extreme pressure agent; an antioxidant such as an amine-based or a phenol-based antioxidant; a metal deactivator such as benzotriazole; a viscosity index improver such as a polymethacrylate or a polystyrene; and a solid lubricant such as molybdenum disulfide or graphite. Those additives may be used alone, or two or more kinds thereof may be used in combination.

In the present invention, the ball non-contact surface 31 is provided in the inner peripheral surface, and hence resistance generated at the time of passage of a lubricant through the inside of the pockets can be reduced. Further, an amount of oil films to be formed between the balls 4 and the pockets 12 can be reduced. With this, reduction in torque can be achieved. In addition, the recess 32 forming the ball non-contact surface 31 is opened in at least one of the pocket axial ends, and hence extra lubricant between the inner peripheral surface and the ball (steel ball) can be discharged therethrough. As a result, the effect of the extra lubricant on the torque can be eliminated.

Further, the ball contact surface 30 is provided at a central portion of the inner peripheral surface, and hence the ball (steel ball) 4 can be stably retained in the pocket central portion. Thus, it is possible to prevent backlash of the ball 4, and provide a high-quality product. The C-shape of the recess 32 forming the ball non-contact surface 31 facilitates discharge of the lubricant between the inner peripheral surface and the ball 4 due to a centrifugal force.

With the flange portions 24a and 24b provided as described above, it is possible to restrict inflow of the lubricant into the inside (inside of the bearing) and prevent outflow of the lubricant from the inside (inside of the bearing) to the outside of the bearing. Thus, effective reduction in torque can be achieved. The end surfaces 21 on the opposite side to the coupling portions of the annular members 10 are each formed into the flat shape, and hence stirring resistance of the lubricant can be reduced. As a result, further reduction in torque can be achieved.

Figure 11:
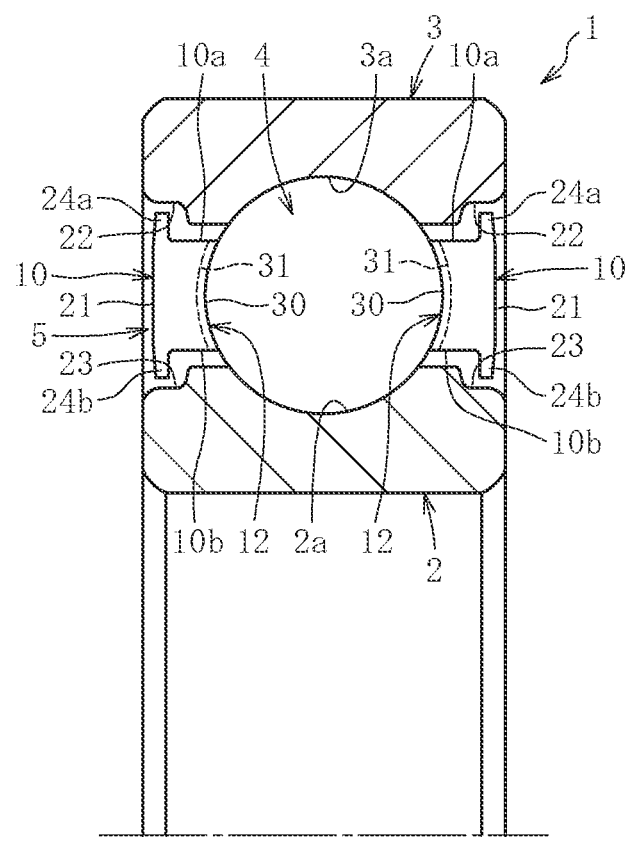
FIG. 11 is a sectional view of a ball bearing using a retainer according to another embodiment of the present invention.

Next, FIG. 11 illustrates a ball bearing using another retainer. In the retainer of this case, the ball contact surface 30 comprises an oblong portion 25 formed at a central portion in a pocket circumferential direction of the inner peripheral surface so as to reach both the pocket axial ends. Further, the ball non-contact surface 31 comprises a pair of circular-arc recesses 26 and 26 provided on both sides in the pocket circumferential direction of the ball contact surface 30. The recesses 26 and 26 are each opened in both the pocket axial ends. In other words, the recesses 26 and 26 each extend from a retainer radially inner surface 10b to reach the retainer radially outer surface 10a, and are opened in each of the retainer radially inner surface 10b and the retainer radially outer surface 10a.

Figure 12:
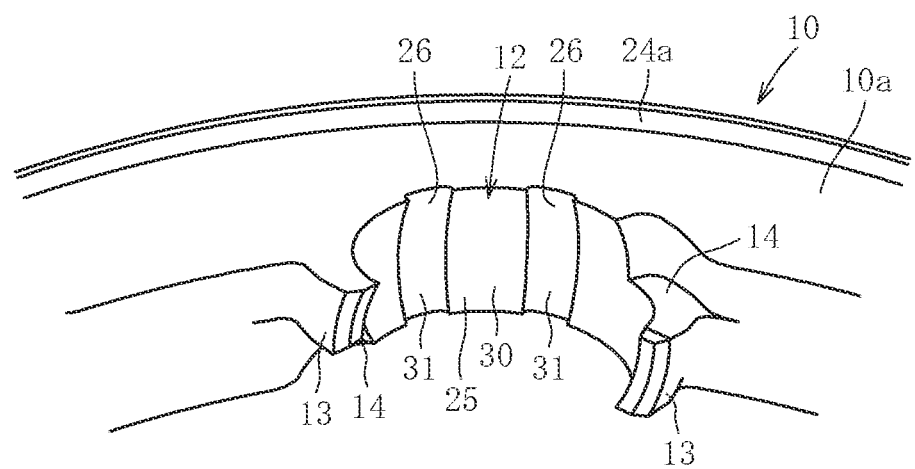
FIG. 12 is an enlarged perspective view of a main part of the retainer illustrated in FIG. 11.

Note that, other structural details of the retainer 5 illustrated in FIG. 12 are the same as those of the retainer 5 illustrated in FIG. 2, and the ball bearing illustrated in FIG. 11 has the same structure as that of the ball bearing illustrated in FIG. 1. Thus, the same parts (same members) of the retainer 5 illustrated in FIG. 12 and the ball bearing illustrated in FIG. 11 as those in FIGS. 1 and 2 are denoted by the same reference symbols, and description thereof is omitted.

Also in this retainer 5, with the ball non-contact surface 31 provided as described above, it is possible to reduce the resistance generated at the time of passage of a lubricant through the inside of the pockets, and an amount of oil films to be sheared due to movement of the balls. As a result, reduction in torque of the bearing (ball bearing) using this retainer can be achieved. Further, with the ball contact surface 30 provided as described above, it is possible to prevent backlash of the ball, and provide a high-quality product. Still further, in this retainer, the extra lubricant between the inner peripheral surface and the ball can be discharged from the bearing radially outer side and the bearing radially inner side. In this way, the surplus can remove influence on torque with the oil.

Figure 13:
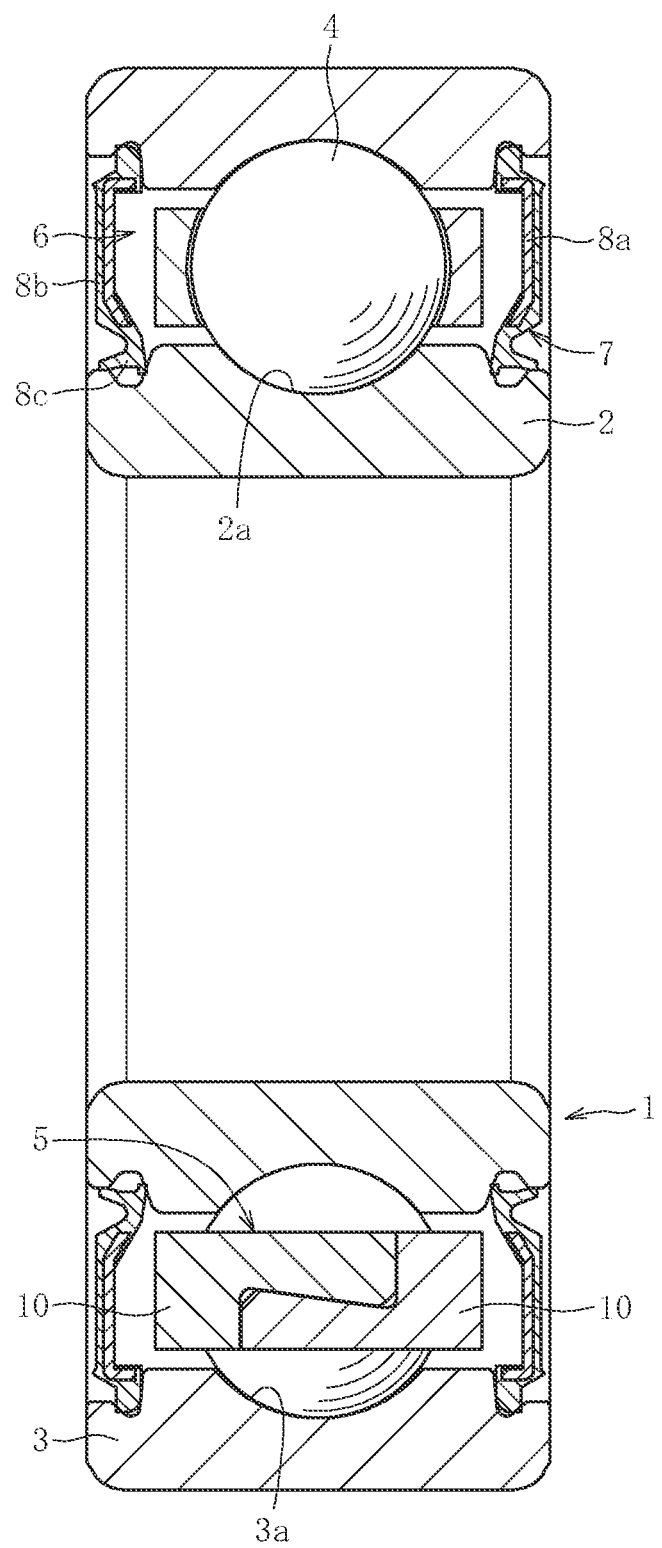
FIG. 13 is a sectional view of a ball bearing comprising seal portions.

By the way, as illustrated in FIG. 13, the ball bearing normally comprises seal portions 7 arranged in an annular space 6 formed between the inner race 2 and the outer race 3.

In this case, the outer race 3 is mounted to the fixed part such as the housing, and the inner race 2 is mounted to the rotary part such as the rotary shaft. The seal portions 7 each comprise a seal member 8b formed of an elastic member such as rubber bonded integrally with a metal core 8a through vulcanization. The seal member 8b comprises a proximal end portion mounted to a radially inner end portion of the outer race 3 on a fixed side, and a distal end portion provided with a seal lip 8c held in contact with a radially outer end portion of the inner race 2. Note that, instead of an inner-race rotary type exemplified in this embodiment, the ball bearing is applicable also to an outer-race rotary type in which the inner race 2 is mounted to the fixed part such as the housing and the outer race 3 is mounted to the rotary part such as the rotary shaft.

As illustrated in FIG. 13, the ball bearing of the present invention is suited to a sealed ball bearing comprising the seal portions 7. With this, deformation of the retainer due to high-speed rotation can be suppressed, and reduction in torque can be achieved through the restriction on an amount of the inflow of a lubricant and the reduction of the stirring resistance. Thus, when this bearing is used in an automobile, fuel efficiency becomes higher, and hence environmentally friendly driving can be performed. In other words, an automotive ball bearing suited to high rotation bearings used in electric vehicles and hybrid vehicles can be provided. In particular, this ball bearing is optimum to automotive transmissions.

Hereinabove, description is made of the embodiments of the present invention. However, the present invention is not limited to the embodiments described above, and various modifications may be made thereto. As the shapes of the ball contact surface 30 and the ball non-contact surface 31, various shapes other than those in the example of the figures can be employed as long as the ball contact surface 30 is arranged at least at the central portion of the inner peripheral surface (central portion in the pocket circumferential direction and central portion in the pocket axial direction) and the ball non-contact surface 31 is opened in any one of the pocket axial ends.

The ball non-contact surface 31 may be appropriately changed in size, depth, and the like in accordance, for example, with the lubricant to be used as long as both the resistance generated at the time of passage of the lubricant and the amount of oil films to be sheared can be reduced.

Further, in the bearing of FIG. 1, the ball non-contact surface 31 is opened to the outer race 3 side. However, in contrast, the ball non-contact surface 31 may be opened to the inner race 2 side. Note that, the number of the pockets for retaining the balls may be arbitrarily increased or reduced.

INDUSTRIAL APPLICABILITY

An automotive ball bearing suited to high rotation bearings used in electric vehicles and hybrid vehicles can be provided.

REFERENCE SIGNS LIST 2 inner race
3 outer race
4 ball
5 retainer
6 annular space
7 seal portion
8c seal lip
10 annular member
11 opposed surface
12 pocket
13 radially outer projection
13a engagement surface
14 radially inner recess
15 radially inner projection
15a engagement surface
16 radially outer recess
17 back surface
21 end surface
24a flange portion
24b flange portion
25 oblong portion
26 recess
30 ball contact surface
31 ball non-contact surface
32 recess
θ inclination angle
m circumferential clearance
n axial clearance

The invention claimed is:

1. A retainer for a ball bearing, comprising two annular members that face each other in an axial direction thereof,
    the two annular members having opposed surfaces each comprising hemispherical pockets that are formed at a plurality of positions in a circumferential direction of each of the two annular members and configured to receive balls,
    the opposed surfaces being snap-fitted to each other so as to couple the two annular members to each other,
    wherein the hemispherical pockets each have an inner peripheral surface including a ball contact surface and a ball non-contact surface,
    wherein the ball contact surface is formed at a central portion in a pocket circumferential direction of the inner peripheral surface and at least at a central portion in a pocket axial direction of the inner peripheral surface, the pocket circumferential direction of the inner peripheral surface being different from the circumferential direction of a corresponding one of the two annular members and the pocket axial direction of the inner peripheral surface being different from the axial direction of the two annular members,
    wherein the ball non-contact surface comprises a recess that is recessed to an opposite side to a corresponding one of the balls across the ball contact surface,
    wherein the recess is opened in at least one of pocket axial ends,
    wherein the ball contact surface comprises an oblong portion formed at the central portion in the pocket circumferential direction of the inner peripheral surface so as to reach both the pocket axial ends,
    wherein the ball non-contact surface comprises circular-arc recesses provided on both sides of the ball contact surface in the pocket circumferential direction of the inner peripheral surface, and
    wherein the circular-arc recesses are each opened in both the pocket axial ends.

2. A retainer for a ball bearing according to claim 1, further comprising coupling portions for coupling the two annular members to each other by snap-fitting the opposed surfaces to each other,
    wherein the coupling portions are provided at both end portions in the pocket circumferential direction of the inner peripheral surface of each of the hemispherical pockets, and
    wherein the two annular members each have a back surface located on an opposite side to a corresponding one of the opposed surfaces and formed into a flat shape over an entire periphery thereof.

3. A retainer for a ball bearing according to claim 2, wherein the coupling portions each comprise:
a radially outer projection formed by extending, in the axial direction of the two annular members, a radially outer side of the end portion in the pocket circumferential direction of the inner peripheral surface of each of the hemispherical pockets of a first of the two annular members so as to allow the inner peripheral surface of each of the hemispherical pockets thereof to abut against the corresponding one of the balls;
a radially inner recess formed by recessing a radially inner side of the end portion in the pocket circumferential direction of the inner peripheral surface of each of the hemispherical pockets of the first of the two annular members;
a radially inner projection formed by extending, in the axial direction of the two annular members, a radially inner side of the end portion in the pocket circumferential direction of the inner peripheral surface of each of the hemispherical pockets of a second of the two annular members so as to allow the inner peripheral surface of each of the hemispherical pockets thereof to abut against the corresponding one of the balls; and
a radially outer recess formed by recessing a radially outer side of the end portion in the pocket circumferential direction of the inner peripheral surface of each of the hemispherical pockets of the second of the two annular members,
wherein the radially outer projection and the radially inner projection are engaged with each other in the axial direction of the two annular members by inserting the radially outer projection into the radially outer recess and by inserting the radially inner projection into the radially inner recess, and
wherein an engagement surface of the radially outer projection and an engagement surface of the radially inner projection are inclined with respect to the axial direction of the two annular members such that the radially outer projection and the radially inner projection are each thicker on a distal end side than on a proximal end side.

\* \* \* \* \*